(12) United States Patent
Nilsson et al.

(10) Patent No.: US 11,030,433 B2
(45) Date of Patent: Jun. 8, 2021

(54) BIOMETRIC IMAGING DEVICE AND METHOD FOR MANUFACTURING THE BIOMETRIC IMAGING DEVICE

(71) Applicant: Fingerprint Cards AB, Gothenburg (SE)

(72) Inventors: René Nilsson, Eslöv (SE); Hans Martinsson, Gothenburg (SE); Ehsan Hashemi, Gothenburg (SE)

(73) Assignee: Fingerprint Cards AB, Göteborg (SE)

( * ) Notice: Subject to any disclaimer, the term of this patent is extended or adjusted under 35 U.S.C. 154(b) by 0 days.

(21) Appl. No.: 16/497,118

(22) PCT Filed: Dec. 10, 2018

(86) PCT No.: PCT/SE2018/051266
§ 371 (c)(1),
(2) Date: Sep. 24, 2019

(87) PCT Pub. No.: WO2019/125271
PCT Pub. Date: Jun. 27, 2019

(65) Prior Publication Data
US 2020/0380237 A1    Dec. 3, 2020

(30) Foreign Application Priority Data

Dec. 21, 2017 (SE) .................... 1751613-9

(51) Int. Cl.
*G06K 9/00* (2006.01)
*G06K 9/20* (2006.01)

(52) U.S. Cl.
CPC ....... *G06K 9/0004* (2013.01); *G06K 9/00046* (2013.01); *G06K 9/2027* (2013.01)

(58) Field of Classification Search
CPC .. G06K 9/0004; G06K 9/00013; G06F 3/042; G06F 2203/0338
See application file for complete search history.

(56) References Cited

U.S. PATENT DOCUMENTS

2007/0109438 A1   5/2007  Duparre et al.
2008/0031497 A1   2/2008  Kishigami et al.
(Continued)

FOREIGN PATENT DOCUMENTS

CN   107358216 A   11/2017
CN   107480579 A   12/2017
(Continued)

OTHER PUBLICATIONS

Final Notice dated Sep. 6, 2019 from Swedish Patent and Registration Office for Swedish Application No. 1751613-9, 38 pages.
(Continued)

*Primary Examiner* — Yuzhen Shen
(74) *Attorney, Agent, or Firm* — RMCK Law Group, PLC (57) ABSTRACT

There is provided a biometric imaging device configured to be arranged under an at least partially transparent display panel and configured to capture an image of an object in contact with an outer surface of the display panel. The biometric imaging device comprises: an image sensor comprising a photodetector pixel array; a transparent substrate arranged to cover the image sensor; an opaque layer covering an upper surface of the transparent substrate, wherein the opaque layer further comprises a plurality of separate openings; and a plurality of microlenses, each microlens being arranged in alignment with a respective opening of the opaque layer; wherein each microlens is configured to redirect light through the transparent substrate and onto a subarray of pixels in the photodetector pixel array.

16 Claims, 10 Drawing Sheets

(56) References Cited

U.S. PATENT DOCUMENTS

| | | |
|---|---|---|
| 2012/0242884 A1 | 9/2012 | Ishiguro et al. |
| 2014/0218327 A1 | 8/2014 | Shi et al. |
| 2015/0187980 A1 | 7/2015 | Yamamoto |
| 2016/0110025 A1 | 4/2016 | Hossu |
| 2016/0266695 A1 | 9/2016 | Bae et al. |
| 2017/0270342 A1 | 9/2017 | He et al. |
| 2018/0012069 A1* | 1/2018 | Chung ................ G06K 9/2036 |
| 2018/0336389 A1* | 11/2018 | Wu ........................ G01J 1/44 |
| 2019/0095674 A1* | 3/2019 | Ko ...................... H01L 27/3227 |
| 2020/0117878 A1* | 4/2020 | Li ....................... H01L 27/3234 |

FOREIGN PATENT DOCUMENTS

| | | |
|---|---|---|
| EP | 2827283 A1 | 1/2015 |
| EP | 3267359 A1 | 1/2018 |
| WO | 2017132258 A1 | 8/2017 |
| WO | 2017202323 A1 | 11/2017 |

OTHER PUBLICATIONS

Notice dated Aug. 24, 2018 from Swedish Patent and Registration Office (PRV) for Swedish Application No. 1751613-9, 6 pages.

Notice dated Feb. 20, 2019 from Swedish Patent and Registration Office (PRV) for Swedish Application No. 1751613-9, 4 pages.

PCT International Search Report and Written Opinion dated Feb. 20, 2019 for International Application No. PCT/SE2018/051266, 15 pages.

Swedish Search Report dated Dec. 21, 2017 for Swedish Application No. 1751613-9, 3 pages.

Extended European Search Report dated Dec. 11, 2020 for European Patent Application No. 18891412.1, 8 pages.

\* cited by examiner

BIOMETRIC IMAGING DEVICE AND METHOD FOR MANUFACTURING THE BIOMETRIC IMAGING DEVICE

CROSS-REFERENCE TO RELATED APPLICATIONS

This application is a 371 U.S. National Stage of International Application No. PCT/SE2018/051266, filed Dec. 10, 2018, which claims priority to Swedish Patent Application No. 1751613-9, filed Dec. 21, 2017. The disclosures of each of the above applications are incorporated herein by reference in their entirety.

FIELD OF THE INVENTION

The present invention relates to an optical fingerprint sensing device suitable for integration in a display panel and to a method for manufacturing such a sensor. In particular, the invention relates to an optical fingerprint sensor comprising a plurality of microlenses.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

US 2007/0109438 describe an optical imaging system which may be used as a fingerprint sensor where microlenses are arranged to redirect light onto a detector. In the described imaging system, each microlens constitutes a sampling point and the microlenses are arranged close to each other to increase the image resolution. To avoid mixing of light received from adjacent microlenses, micro-channels or apertures are arranged between the microlenses and the detector.

However, to achieve a high-resolution sensor, the microlenses will have to be made small and be manufactured with high precision, making the manufacturing process complex and sensitive to variations, and a sensor of the described type comprising small microlenses will also be sensitive to spatial differences in transmissivity in any layer covering the sensor.

Accordingly, it is desirable to provide an improved optical fingerprint sensing device.

SUMMARY

In view of above-mentioned and other drawbacks of the prior art, it is an object of the present invention to provide a biometric imaging device suitable to be arranged under a display panel to thereby provide in-display fingerprint sensing functionality. There is also provided a method for manufacturing such a biometric imaging device.

According to one embodiment of the invention, there is provided a biometric imaging device configured to be arranged under an at least partially transparent display panel and configured to capture an image of an object in contact with an outer surface of the display panel, the biometric imaging device comprising: an image sensor comprising a photodetector pixel array; a transparent substrate arranged to cover the image sensor; an opaque layer covering an upper surface of the transparent substrate, wherein the opaque layer further comprises a plurality of separate openings; and a plurality of microlenses, each microlens being located in a respective opening of the opaque layer in the same plane as the opaque layer; wherein each microlens is configured to redirect light through the transparent substrate and onto a subarray of pixels in the photodetector pixel array.

The outer surface of a display panel under which the biometric imaging device is arranged may also be referred to as a sensing surface. The operating principle of the described biometric imaging device is that light emitted by pixels in the display panel will be reflected by a finger placed on the sensing surface, and the reflected light is received by the microlenses and subsequently redirected onto a corresponding subarray of pixels in the photodetector pixel array for each microlens. Thereby an image of a portion of a finger can be captured for each subarray, and by combining the images from all of the microlenses, an image representing the fingerprint can be formed and subsequent biometric verification can be performed.

The openings in the opaque layer here act as apertures allowing light to pass through the apertures via the microlenses. The properties of the microlenses are selected such that each subarray in the photodetector pixel array receives light reflected by a portion of a fingerprint of a finger placed on an exterior surface of the display panel via the microlens. Thereby, a combined image representing the full fingerprint can be formed by combining the images captured by all of the subarrays. When the biometric imaging device is arranged under a display panel, it is sufficient to activate the subarrays corresponding to the location of a finger on the display, instead of activating all of the subarrays in the imaging device. Moreover, it is only necessary to activate the display pixels in locations corresponding to the finger location.

The described configuration of the opaque layer and microlenses allows a sparse arrangement of microlenses where adjacent microlenses are separated by a portion of the opaque layer, corresponding to the separation of the openings in the opaque layer. The preferred distance between adjacent microlenses is determined by a range of parameters and will be discussed in further detail in the following.

By means of the claimed invention, a biometric imaging device is provided which is readily integrated in a display panel to provide in-display fingerprint sensing functionality, and where the imaging device can be made to be insensitive to spatial variations in the transmissivity of the display panel. Moreover, the resolution of the resulting image is not defined only by the microlens array since according to various embodiments of the invention, each microlens in turn redirects light onto a plurality of pixels in the image sensor. The resolution will thus be determined based on a combination of the optical properties of the microlenses and the resolution of the image sensor. Accordingly, the microlenses can be made larger and be arranged at a distance from each other in comparison to a sensor where each microlens corresponds to a single pixel in the resulting image. Thereby, the manufacturing process is simplified and the manufacturing process is also compatible with large scale wafer processing technology as well as large scale package level processing.

The microlens is arranged in the opening of the opaque layer in the same plane as the opaque layer. Thereby, there is no vertical distance between the aperture and the microlenses. This in turn simplifies the manufacturing process since both the opaque layer and the microlenses can be arranged on the transparent substrate. Accordingly, with the microlens arranged in the same plane as the opaque layer and the opening therein, the light collection is high and the risk of stray light reaching the image sensor is minimized.

According to one embodiment of the invention, a size of the microlens corresponds to a size of the opening. Thereby, all of the light received by the microlens is redirected towards the image sensor, and no light which has not passed through a microlens reaches the image sensor.

According to one embodiment of the invention, the microlens may advantageously be configured to focus light onto the sub-array of pixels. Thereby, the light is focused on the image sensor and a sharp image of a portion of the finger can be captured. However, it is in principle possible to use microlenses in a configuration where converging light from the microlens forms a slightly defocused/blurred image on the image sensor, meaning that it is not strictly required that the focal point of the lens is located in the plane of the image sensor.

According to one embodiment of the invention, an active subarray defined by a subarray of pixels receiving light from only one microlens is smaller than two times the distance between the microlens and the image sensor.

Theoretically, the image on the image sensor will extend infinitely, but in practice it will basically be zero at angels larger than 45 degrees. The image will be defocused due to field curvature and due to a reduction of light collected by the lens as the angle increases. The field curvature depends quadratically on both the angle (field-of-view) and the size of the lens. Accordingly, a lens with half the diameter will have a quarter of the field curvature, but also a quarter of the light.

Moreover, all or part of the active subarray can be defined as a quality area which is used during readout and/or subsequent image processing to form an image of a portion of the finger. However, such a quality area may be of any suitable shape such as circular, elliptical or rectangular, and it is not required that the quality area has the same shape as the microlens, which may be circular, elliptical or rectangular, since the configuration of the quality area can be determined by the readout method and subsequent image processing techniques.

According to one embodiment of the invention, the plurality of openings in the opaque layer are arranged to form an array of openings having a pitch which is larger than half the size of the active subarray of pixels in the photodetector pixel array. Thereby it can be avoided that adjacent subarrays are completely overlapping and it can be ensured that light from only one lens reaches a certain number of image sensor pixels in the image sensor. In principle, the size of the non-overlapping area, which can be seen as defining an effective subarray, increases with increasing distance between the microlenses.

According to one embodiment of the invention, the subarray may have a size in the range of 20 µm to 2 mm.

According to one embodiment of the invention, the microlens may be a circular lens having a diameter in the range of 20 µm to 1 mm or a rectangular lens having a length of a shortest side in the range of 20 µm to 1 mm. Moreover, the microlens may have a height in the range of 2 µm to 600 µm.

According to one embodiment of the invention, the microlenses may be arranged in an array having a pitch in the range of 50 µm to 2 mm, and the array may be arranged in any pattern, such as a square, rectangular or With the above described possible configurations of the plurality of microlenses, an optical fingerprint senor for use under a display panel can be provided, and the specific configuration can be adapted based on the properties of the display panel and on the requirements for the application at hand.

According to one embodiment of the invention, the biometric imaging device may further comprise at least one intermediate layer between the opaque layer and the transparent substrate. The intermediate layer may for example be a layer improving the adhesion of the opaque layer to the transparent substrate and/or for improving the mechanical/thermal stability and reliability of the entire structure. Any intermediate layer located between the microlens and the transparent substrate preferably has high transparency and has the same refractive index as either the microlens or the transparent substrate to avoid undesirable refractions and/or reflections at the interfaces between adjacent layers.

According to one embodiment of the invention the biometric imaging device may further comprise at least partially transparent display panel arranged to cover the opaque layer. The display panel may for example be based on OLED, LCD, µLED and similar technologies. Thereby, in-display biometric imaging is enabled.

According to one embodiment of the invention, the biometric imaging device may further comprise at least one intermediate layer between the opaque layer and the display panel. An intermediate layer between the opaque layer and the display panel may for example be an antireflection coating covering both the opaque layer and the microlenses. There may also be an airgap between the microlenses and the display panel in order to provide a material with a low refractive index next to the microlens. However, the air gap does not exclude the existence of one or more intermediate layers arranged on the microlenses and the opaque layer. The intermediate layer may for example have a refractive index different from the refractive index of the microlens. The refractive index of the intermediate layer can also be higher than the refractive index of the lens. In this case, the curvature of the lens must be reversed so that it is curved towards the higher index material.

According to one embodiment of the invention, the display panel is at least partially transparent at locations corresponding to the locations of the microlenses. Accordingly, it is not strictly required that the display panel is fully transparent, it is only required that the display panel is sufficiently transparent at the locations of the microlenses such that enough light can pass through the display and reach the microlenses to enable image capture by the image sensor.

According to one embodiment of the invention, the display panel has a repeating transmission pattern, each unit cell in the repeatable pattern comprising a first portion having a higher transparency than a second portion, and wherein the microlenses are arranged in locations corresponding to the first portion. Since the display panel comprises a pixel array and corresponding circuitry for controlling the pixel array, the transparency of the display may vary in a repeatable manner in accordance with e.g. the display pixels. Accordingly, a display unit cell, which may be defined arbitrarily, can be seen as having an area portion with a higher transparency and an area portion with a lower transparency. Since it is desirable to have as much light as possible reaching the image sensor, the microlenses are preferably aligned with the portion or portions of the display unit cell having the highest transparency.

According to one embodiment of the invention, the microlens may have a size larger than a period of the repeating transmission pattern. Thereby, the image formed by the subarray is based on an average over more than one of the above described display unit cells. This in turn has the advantage that the relative alignment of the microlens in relation to the transmission pattern can be selected arbitrarily.

According to one embodiment of the invention, the biometric imaging device may further comprise a plurality of electrically conductive structures arranged on the opaque layer, wherein the electrically conductive structures are connected to sensing circuitry and configured to detect an object touching a surface of the display panel. The electrically conductive structures can be provided as an array of structures in some or all of the areas between the microlenses of the imaging device. It is also possible to form a sparse array of electrically conductive structures on the opaque layer. The electrically conductive structures are advantageously formed as plates or pads to form a capacitive coupling with a finger placed on the surface of the display, and the sensing circuitry is thereby configured to detect the capacitive coupling. The described electrically conductive structures can then be used to provide a "finger detect" or "wake up" functionality so that the optical sensor can be deactivated or in standby mode until the presence of a finger on the display panel is detected. Moreover, the plurality of electrically conductive structures may also be used to determine the location of one or more fingers on the display surface such that only subarrays in the required locations are activated to acquire a fingerprint image, thereby providing a more power efficient imaging device.

According to one embodiment of the invention, the biometric imaging device may further comprise a polarizing filter located between the display panel and the image sensor.

According to one embodiment of the invention, the biometric imaging device may further comprise an optical filter located between the display panel and the image sensor. The optical filter may also be referred to as a wavelength filter or a spectral filter, allowing light of a certain wavelength or within a specific wavelength range to pass.

The polarizing filter and the color filter can be used to avoid that light reaches the image sensor which has not been emitted by the display panel and reflected by a finger. It may for example be possible to control the display to emit light of a predetermined polarization or within a known color range, and to provide a filter allowing only light having the properties of the emitted light to reach the image sensor.

According to a second aspect of the invention, there is provided a biometric imaging device configured to be arranged under an at least partially transparent display panel and configured to capture an image of an object in contact with an outer surface of the display panel, the biometric imaging device comprising: an image sensor comprising a photodetector pixel array; a transparent substrate arranged to cover the image sensor; an opaque layer covering an upper surface of the transparent substrate, wherein the opaque layer further comprises a plurality of separate openings; and a plurality of microlenses, each microlens being located above and at a distance from a respective opening of the opaque layer such that a focal point of each microlens is located between the opaque layer and the image sensor; wherein each microlens is configured to redirect light through the transparent substrate and onto a subarray of pixels in the photodetector pixel array.

The microlens is thus placed at a vertical distance from the opaque layer but in alignment with the opening in the opaque layer so that light passing through the microlens reaches the image sensor. The vertical distance between the opening and the microlens may be defined by an intermediate transparent layer deposited or otherwise arranged on the opaque layer.

According to one embodiment of the invention, a vertical distance between the microlens and the opening is preferably less than half the focal length of the lens. Thereby, even though the microlens preferably is placed as close as possible to the opaque layer or in the same plane as the opaque layer, there may be applications and designs where it is not possible to place the microlens in the plane of the opaque layer. In such an application, the microlens is preferably placed no further from the plane of the opaque layer than half the focal length of the microlens. The performance of the imaging device will be somewhat degraded with increasing distance between the microlens and the opening since there is risk for leakage of light through the opening.

Further effects and features of the second aspect of the invention are largely analogous to those described above in connection with the first aspect of the invention.

According to a third aspect of the invention, there is provided a method for manufacturing a biometric imaging device, the method comprising: providing an image sensor comprising a photodetector pixel array; arranging a transparent substrate to cover the image sensor; forming an opaque layer on the transparent substrate; forming openings in the opaque layer; and arranging a plurality of microlenses in locations aligned with the openings of the opaque layer.

According to one embodiment of the invention, the method may further comprise arranging an at least partially transparent display panel on top of the opaque layer and the microlenses.

According to one embodiment of the invention, the method may further comprise forming a plurality of electrically conductive structures on the opaque layer. The electrically conductive structures may be non-overlapping with the openings in the opaque layer. However, if a transparent metal such as ITO is used, the conductive structures may be allowed to overlap the openings and/or the microlenses.

Further effects and features of the third aspect of the invention are largely analogous to those described above in connection with the first and second aspect of the invention.

According to a fourth aspect of the invention, there is provided a method for manufacturing a biometric imaging device. The method comprises providing an image sensor comprising a photodetector pixel array; arranging a transparent substrate to cover the image sensor; providing a transparent carrier; forming an array of microlenses in the transparent carrier, thereby forming a microlens substrate; forming an opaque layer on the microlens substrate, wherein the opaque layer does not cover the microlenses; and arranging the microlens substrate on the transparent substrate.

The microlenses can be formed by means of micromachining, thereby providing a relatively easy and cost effective manufacturing method where it is not required to manufacture and handle individual lenses.

Moreover, the microlens substrate may be a full wafer, and the image sensor may be provided as a wafer comprising a plurality of image sensors. The described biometric imaging device can then be manufactured in an efficient manner by forming the microlens wafer separately form the image sensor wafer, followed by bonding the two wafers together and dicing to form the final biometric imaging devices.

The skilled person readily realizes that the third aspect of the invention may be performed in combination with the steps of forming electrically conductive structures and arranging a transparent display panel on the opaque layer as described above in relation to the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging device according to the present invention are mainly described with reference to a biometric imaging device arranged under a display panel. However, it should be noted that the described imaging device also may be used in other optical fingerprint imaging applications such as in an optical fingerprint sensor located under a cover glass or the like.

Figure 1:
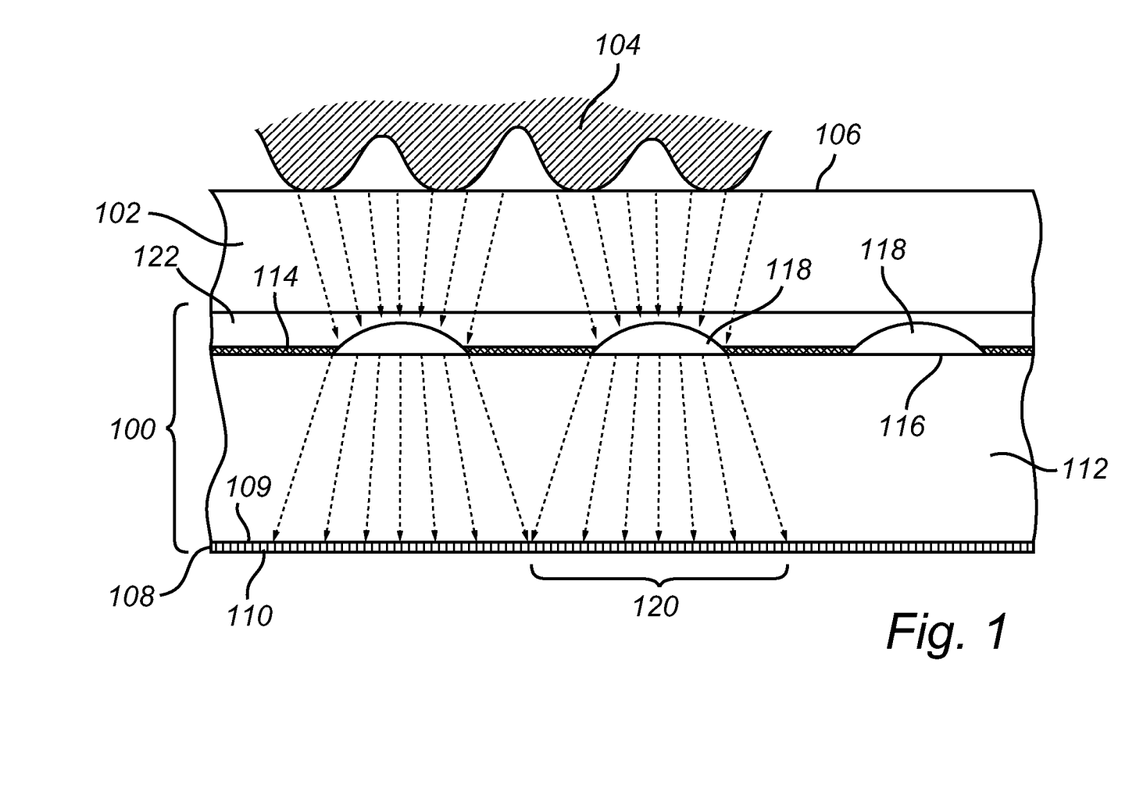
FIG. 1 schematically illustrates a biometric imaging device according to an embodiment of the invention.

FIG. 1 schematically illustrates a biometric imaging device 100 according to an embodiment of the invention. The biometric imaging device 100 is here arranged under an at least partially transparent display panel 102. However, the biometric imaging device 100 may be arranged under any cover structure which is sufficiently transparent, as long as the image sensor receives a sufficient amount of light to capture an image of a biometric object in contact with the outer surface of the cover structure, such as a fingerprint or a palmprint. In the following, a biometric imaging device 100 configured to capture an image of a finger 104 in contact with an outer surface 106 of the display panel 102 will be described.

The biometric imaging device 100 comprises an image sensor 108 comprising a photodetector pixel array 109, where each pixel 110 is an individually controllable photodetector configured to detect an amount of incoming light and to generate an electric signal indicative of the light received by the detector. The image sensor 108 may be any suitable type of image sensor, such as a CMOS or CCD sensor connected to associated control circuitry. The operation and control of such an image sensor can be assumed to be known and will not be discussed herein.

The biometric imaging device 100 further comprises a transparent substrate 112 arranged to cover the image sensor 108, an opaque layer 114 covering an upper surface of the transparent substrate 112. The opaque layer 114 further comprises a plurality of separate openings 116, arranged at a distance from each other; and a plurality of microlenses 118. Each microlens 118 is arranged in a respective opening 116 of the opaque layer 114 in the same plane as the opaque layer 114. Moreover, the microlens 118 has the same size and shape as the opening 116 to prevent any stray light which has not passed through the microlens 118 from reaching the image sensor 108.

In another embodiment the microlenses 118 may be arranged above the opaque layer 114, i.e. at a vertical distance from the opaque layer 114, with the focal point of the microlens 118 being located between the opaque layer 114 and the image sensor 108.

Each microlens 118 is configured to redirect light through the transparent substrate 112 and onto a subarray 120 of pixels in the photodetector pixel array 109. The subarray 120 is here defined as an array of pixels which receives light from only one microlens 118. It should further be noted that the microlenses 118 and display pixels are not drawn to scale. The microlenses 118 receives light reflected by the finger 104 which has propagated through the display panel 102 before reaching the microlens 118, and the light received by the microlens 118 is focused onto the image sensor 108.

The microlenses 118 are here illustrated as plano-convex lenses having the flat surface orientated towards the transparent substrate. It is also possible to use other lens configurations and shapes. A plano-convex lens may for example be arranged with the flat surface towards the display panel 102, and in one embodiment the lens may be attached to a bottom surface of the display panel 102 even though the imaging performance may be degraded compared to the reverse orientation of the microlens. It is also possible to use other types of lenses such as convex lenses. An advantage of using a plano-convex lens is the ease of manufacturing and assembly provided by a lens having a flat surface.

The biometric imaging device 100 further comprises an intermediate layer 122 located between the opaque layer 114 and the display panel 102. The intermediate layer 122 may for example be an adhesive layer used to attach the display panel 102 to the imaging device 100, and a refractive index of the intermediate layer 122 is different from a refractive index of the microlenses 118. The intermediate layer 122 may also comprise an antireflection coating, an optical filter and/or a polarizing filter, which are not illustrated separately herein. It is in general preferable that the refractive index of the microlenses 118 is as high as possible and that it is different from the refractive index of any adjacent material above or below the microlens 118.

Figure 2:
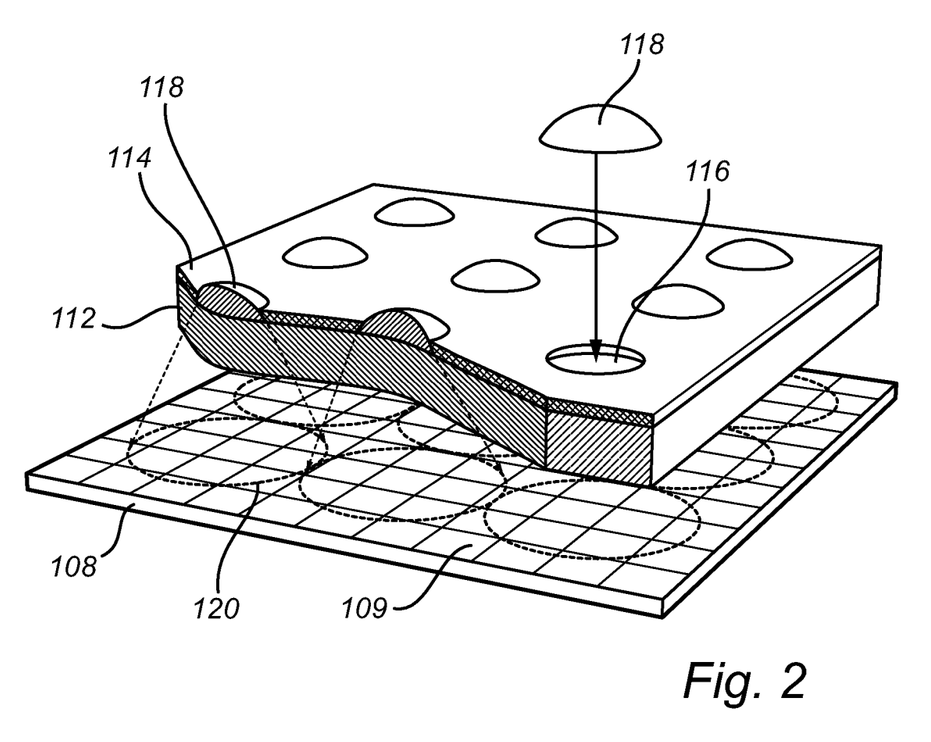
FIG. 2 schematically illustrates a biometric imaging device according to an embodiment of the invention.

FIG. 2 is an exploded view of the biometric imaging device 100 more clearly illustrating the subarray 120 of pixels in the pixel array 109 receiving light from one microlens 118. The microlenses 118 are here illustrated as circular plano-convex lenses, providing a circular subarray 120 of pixels. It would also be possible to use a rectangular microlens which would lead to an approximately rectangular subarray of pixels. The pitch of the microlenses 118 is at least larger than half of size of the subarray 120, or larger than the diameter of the microlens 118, whichever is the largest. For a circular microlens 118, the diameter of the microlens 118 may be in the range of 20 µm to 1 mm and for a rectangular microlens the length of a shortest side may be in the range of 20 µm to 1 mm. Furthermore, the microlenses 118 have a height in the range of 2 µm to 600 µm and are arranged in a sparse array configuration having a pitch in the range of 50 µm to 2 mm. All of the microlenses 118 within the microlens array are preferably of the same size and shape.

In FIG. 2 it can also be seen that the subarrays 120 are non-overlapping which is preferable even though it may not be strictly required. Each microlens 118 thus redirects light onto a pixel array 120 comprising a plurality of light sensing elements such that an image is captured by the subarray 120 for the corresponding microlens 118. Each image represents a portion of the fingerprint, and by combining the captured images a complete image of the finger can be derived and used for further authentication and verification. The image analysis required to derive a fingerprint image after capturing the plurality of images from the plurality of subarrays can be performed in many different ways and will not be discussed in detail herein.

It can be noted that to capture an image of the fingerprint, only subarrays located directly underneath the finger need to be activated, thereby providing a power efficient and fast image capture. Moreover, the activation of the subarrays can be performed sequentially so that not all subarrays need to be activated all at the same time, thereby enabling the use of simplified readout circuitry.

Figure 3:
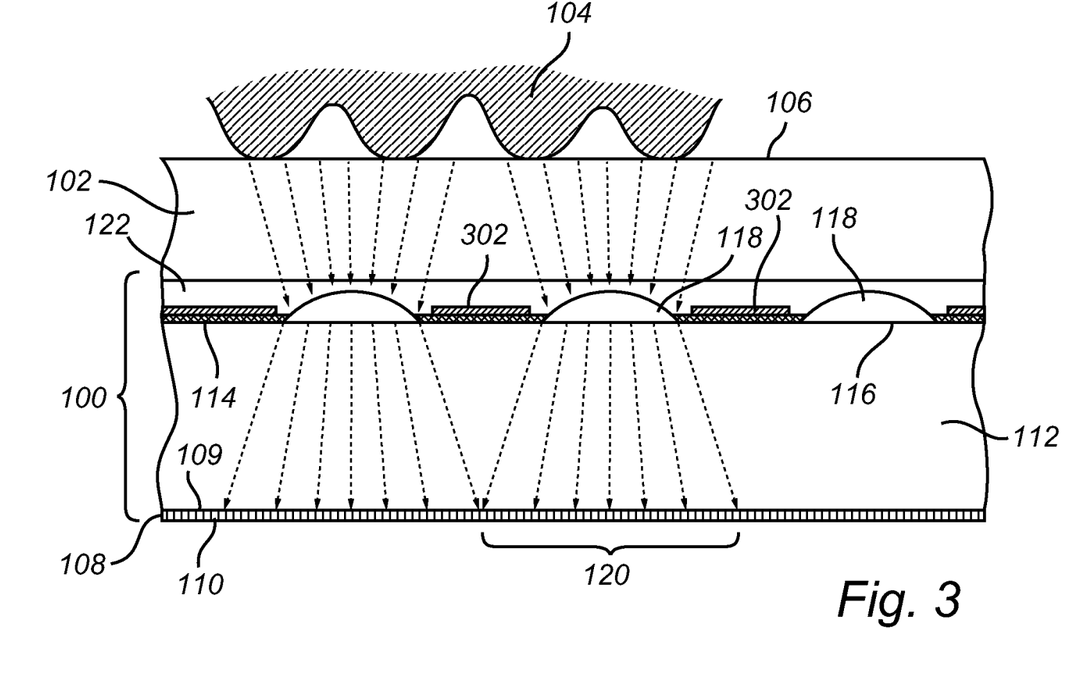
FIG. 3 schematically illustrates a biometric imaging device according to an embodiment of the invention.

FIG. 3 schematically illustrates an example embodiment of the biometric imaging device 100 comprising electrically conductive structures 302 arranged on the opaque layer 114, wherein the electrically conductive structures 302 are connected to sensing circuitry (not shown) and configured to detect an object touching a surface of the display panel. The electrically conductive structures 302 are capacitive sensing plates configured to detect a capacitive coupling between the sensing plate and an organic object in contact with the outer surface 106 of the display panel 102. The electrically conductive structures 302 are here illustrated as being located between the microlenses 118. However, if a transparent conductive material is used, it is also possible to arrange the electrically conductive structures 302 such that a microlens 118 is fully or partially covered by an electrically conductive structure 302.

Figure 4A:
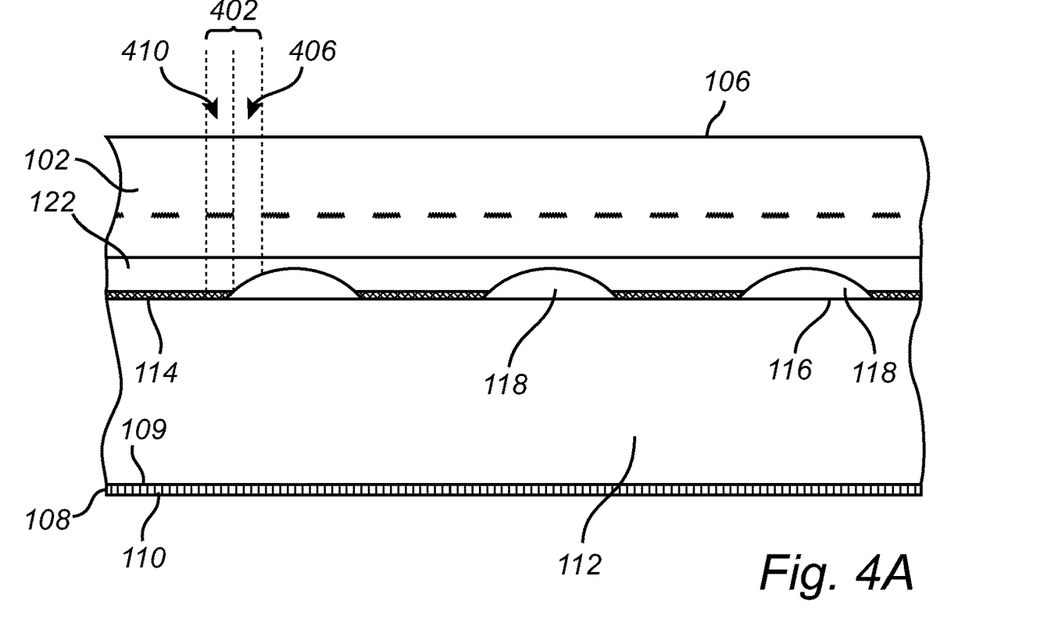
FIGS. 4A-B schematically illustrate a biometric imaging device and a display panel according to embodiments of the invention.
Figure 4B:
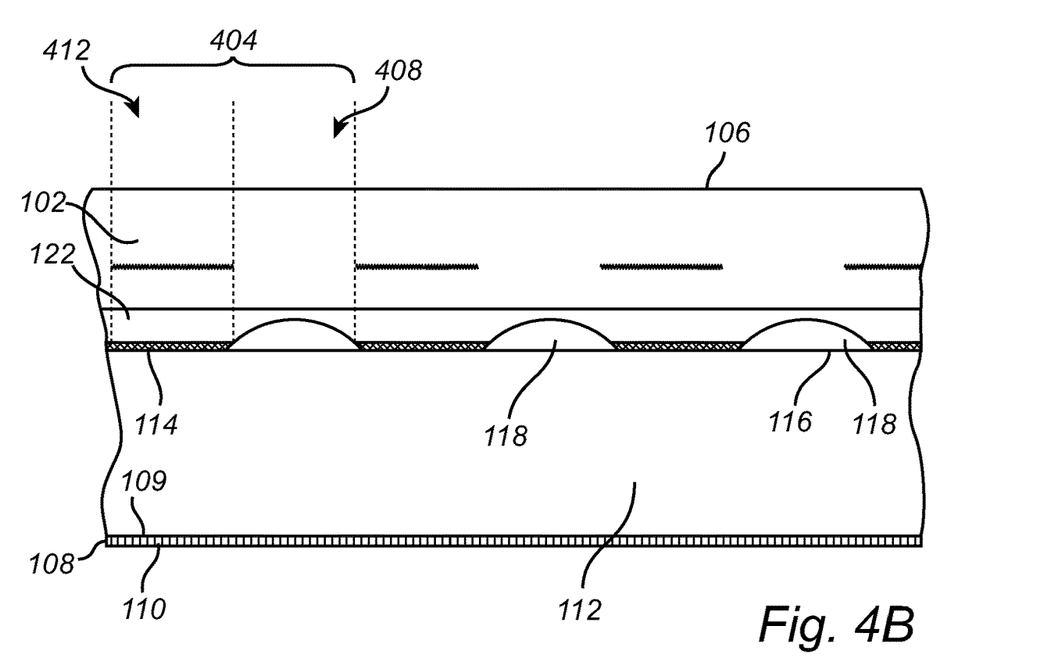

FIGS. 4A-B schematically illustrates display panels 102 having a repeating transmission pattern defined by an array of unit cells 402, 404 where each unit cell in the repeatable pattern comprises a first portion 406, 408 having a higher transparency than a second portion 410, 412. In FIG. 4A, the microlens 118 is larger than the display unit cell 402. For a display panel pixel pitch of about 50 µm, the microlens 118 is typically larger than a unit cell 402 of the display panel 120 such that the microlenses 118 averages the incoming light over many unit cells 402 of the display panel 102.

FIG. 4B illustrates a display panel 102 where the unit cell 404 is larger than the microlens 118. Accordingly, in applications where the microlens 118 is smaller than or having a size similar to the size of the unit cell 404 of the display panel 102, the microlens 118 is preferably aligned with a portion 406 of the unit cell 404 having the highest transmission such that the highest amount of light reaches the microlens 118 and subsequently the image sensor 108.

Figure 5:
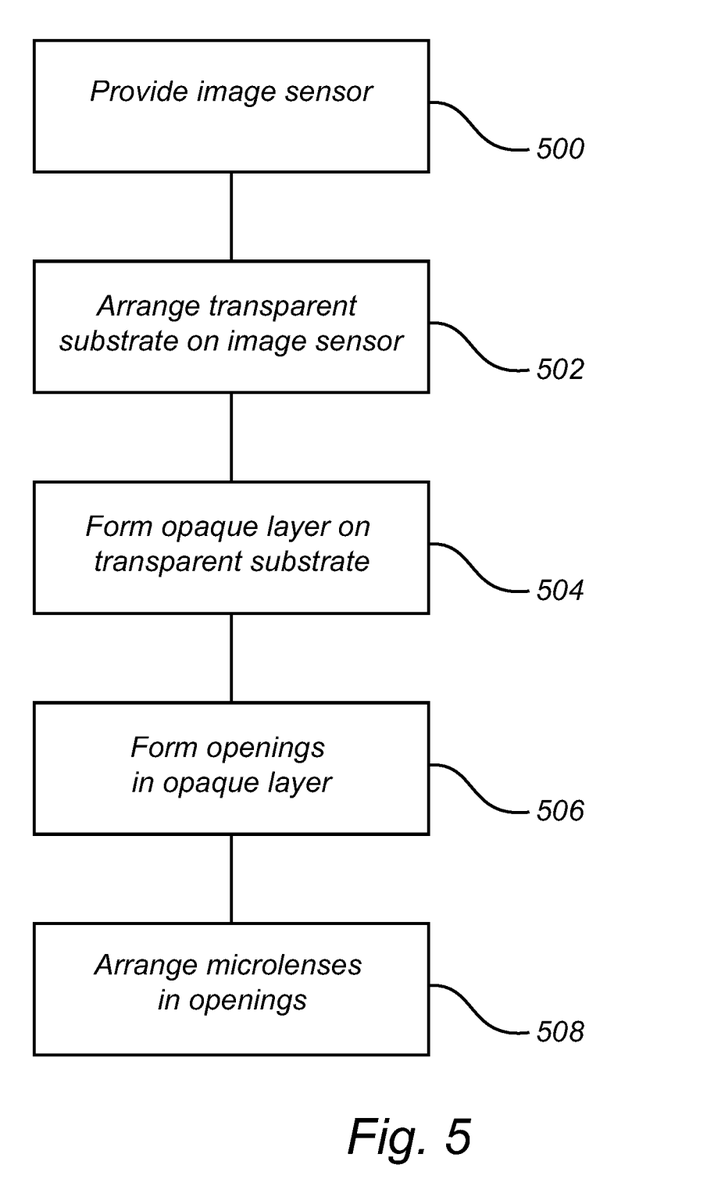
FIG. 5 is a flow chart outlining the general steps of a method of manufacturing a biometric imaging device according to an embodiment of the invention.

FIG. 5 is a flow chart outlining the general steps of a method of manufacturing a biometric imaging device according to an embodiment of the invention. The method will be discussed with further reference to FIGS. 6A-E schematically illustrating steps the manufacturing method.

Figure 6A:
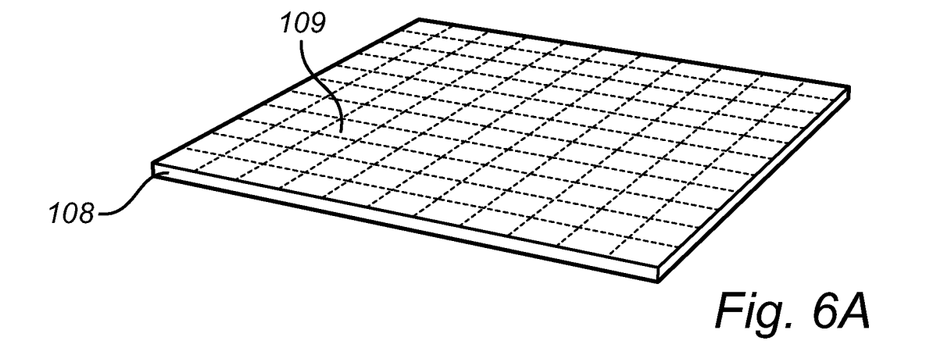
FIGS. 6A-E schematically illustrate steps of a method of manufacturing a biometric imaging device according to an embodiment of the invention.
Figure 6B:
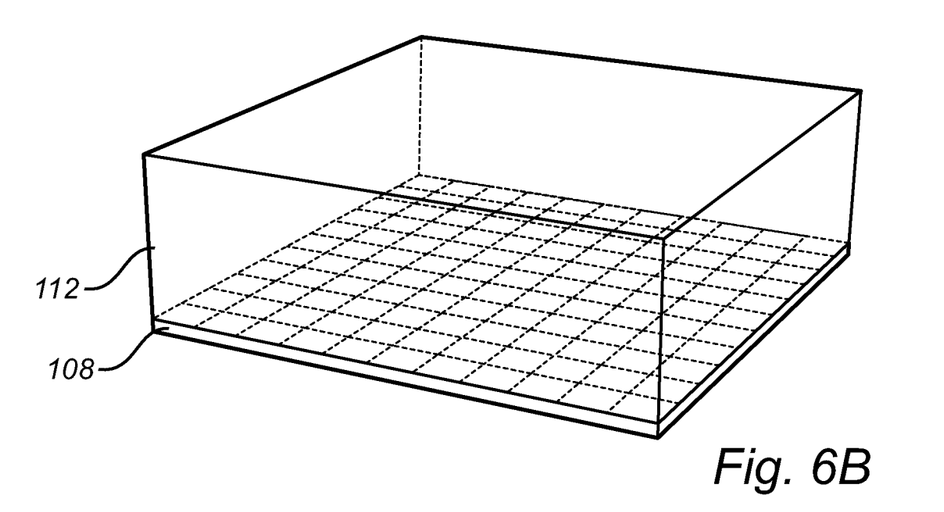

In a first step illustrated in FIG. 6A, an image sensor 108 comprising a photodetector pixel array 109 is provided 500. Next, a transparent substrate 112 is arranged 502 to cover the image sensor 108 as illustrated in FIG. 6B. There may be additional layers between the image sensor 108 and the transparent substrate 112, such as a buffer layer, dielectric layer, IR-filter layer, polarization layer, etc. There may also be additional intermediate layers located on top of the transparent substrate 112.

Figure 6C:
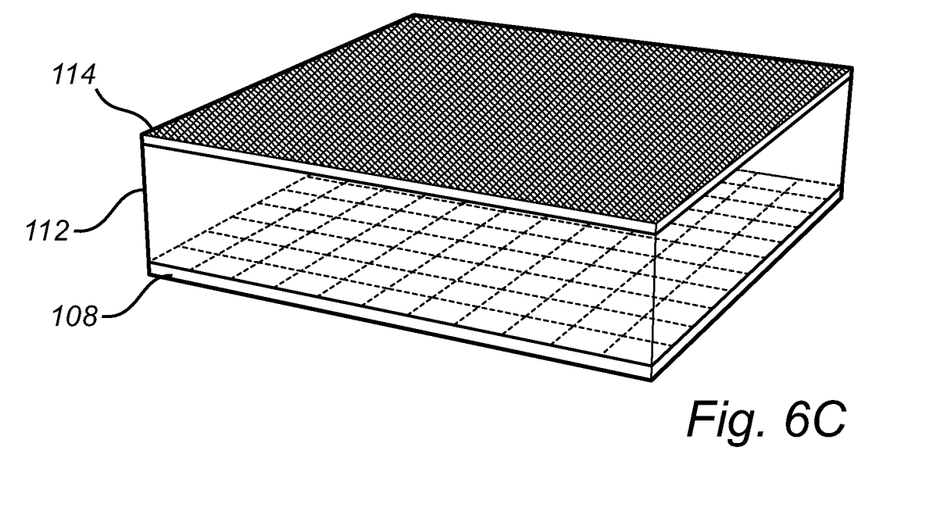
Figure 6D:
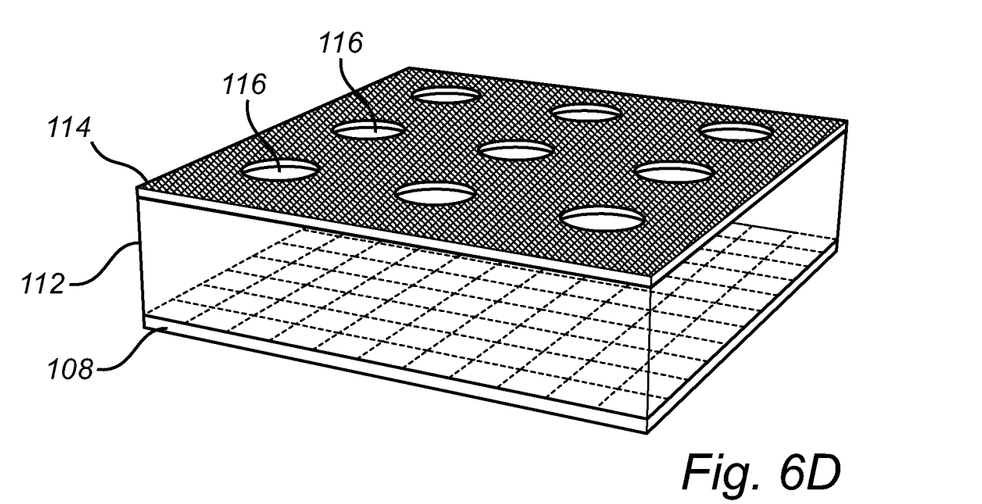

FIGS. 6C and 6D illustrates forming 504 an opaque layer 114 on the transparent substrate 112 and forming 506 openings 116 in the opaque layer 114. The opaque layer 114 may for example be an ink layer having a sufficient thickness so that any light reaching through the layer is negligible. The openings 116 in the opaque layer may be formed using conventional photolithography patterning methods.

Figure 6E:
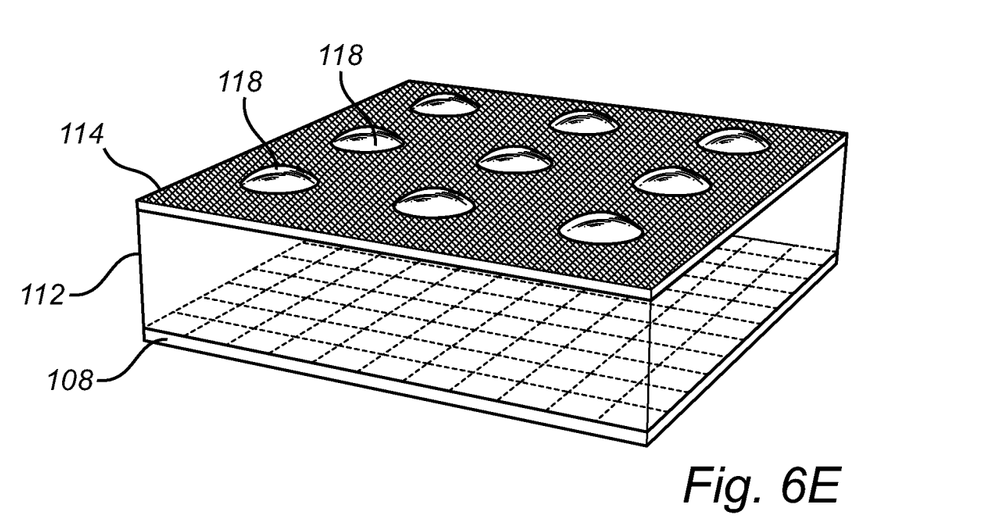

In a final step illustrated by FIG. 6E, a plurality of microlenses 118 are arranged 508 in locations aligned with the openings 116 of the opaque layer 114. Preferably, the microlenses 118 have the same size or are slightly larger than the openings 116. If the microlenses 118 have a different size or shape than the openings 116, a center of the microlens 118 is preferably aligned with a center of the opening 116. In FIG. 6E, the microlenses 118 are arranged in the same plane as the opaque layer 114. It is also possible to perform an additional step of depositing an intermediate transparent layer (not shown) onto the opaque layer 114 prior to arranging the microlenses. The vertical distance between the microlenses 118 is thereby defined by the intermediate layer.

Figure 7:
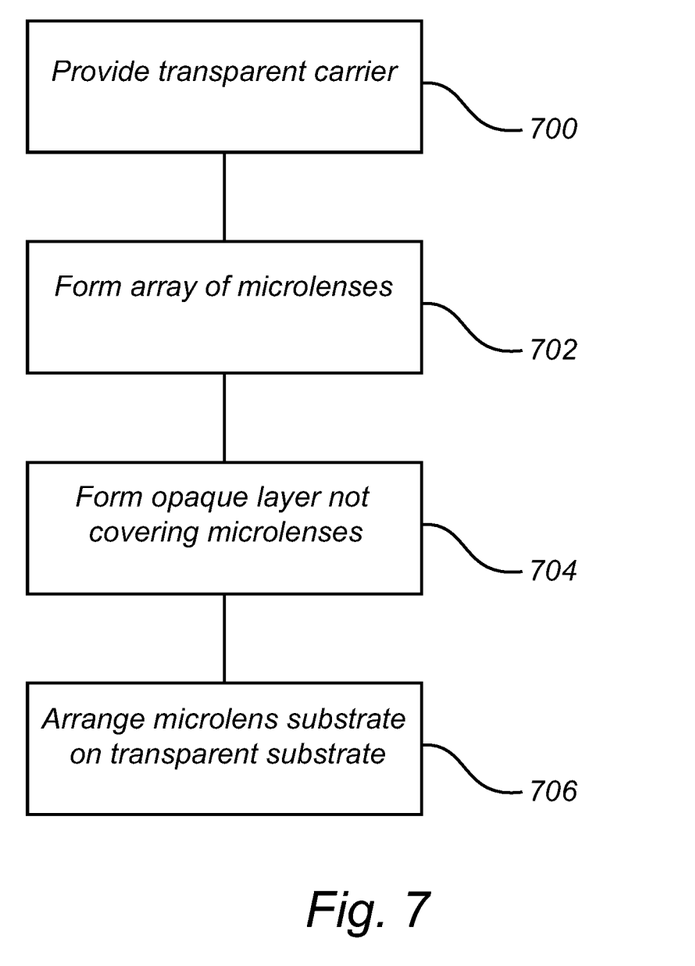
FIG. 7 is a flow chart outlining the general steps of a method of manufacturing a biometric imaging device according to an embodiment of the invention.

FIG. 7 is a flow chart outlining the general steps of a method of manufacturing a biometric imaging device according to an embodiment of the invention. The method will be discussed with further reference to FIGS. 8A-D schematically illustrating steps the manufacturing method.

First, the method comprises the steps of providing 500 an image sensor 108 comprising a photodetector pixel array 109 and arranging 502 a transparent substrate 112 to cover the image sensor 108, which are the same as the steps illustrated in FIGS. 6A-B.

Figure 8A:
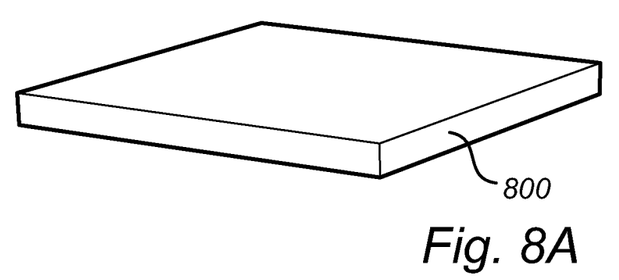
FIGS. 8A-D schematically illustrate steps of a method of manufacturing a biometric imaging device according to an embodiment of the invention.
Figure 8B:
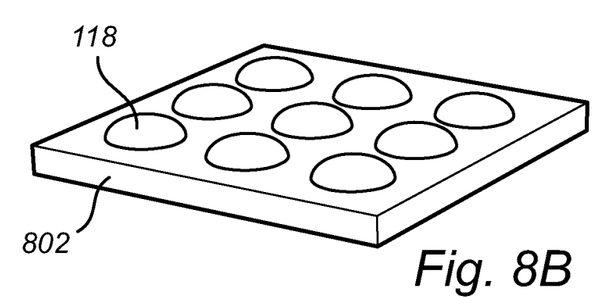

In the following step, a transparent carrier 800 is provided 700 as illustrated in FIG. 8A. Next, a sparse array of microlenses 118 are formed 702 in the transparent carrier 800, thereby forming a microlens substrate 802 illustrated in FIG. 8B. The microlenses 118 are advantageously formed using micromachining. However, any suitable method for forming 3D-structures may be used.

Figure 8C:
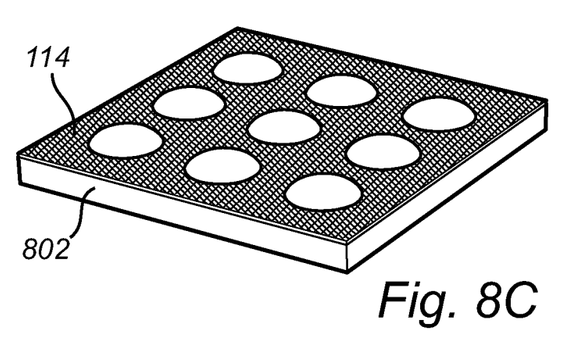

Once the microlenses 118 are formed, an opaque layer 114 is formed 704 on the microlens substrate 802 as illustrated in FIG. 8C. The opaque layer 114 does not cover the microlenses 118, which may be achieved by depositing a blanket layer followed by photolithography and patterning. It may also be possible to deposit the opaque layer 114 using a shadow mask.

Figure 8D:
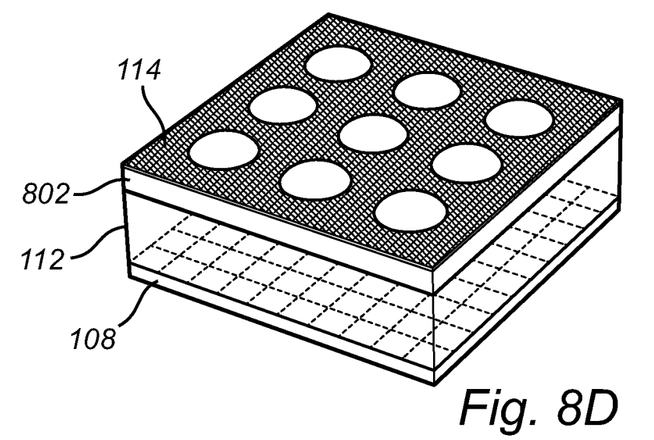

Finally, the microlens substrate 802 is arranged on the transparent substrate 802 as illustrated in FIG. 8D. Depending on the thickness and properties of the microlens substrate 802, and the desired properties of the biometric imaging device, it may be possible to arrange the microlens substrate 802 directly on the image sensor 108 without using the transparent substrate 112.

Figure 9:
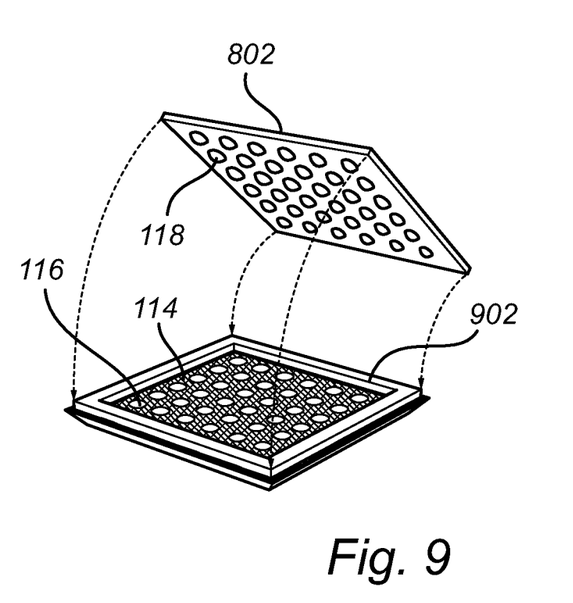
FIG. 9 schematically illustrates a biometric imaging device according to an embodiment of the invention.

FIG. 9 schematically illustrates an example embodiment of the imaging device where the microlenses 118 also are formed on a transparent microlens substrate 802, where the microlenses 118 may be cut to the desired shape directly from a carrier to form the microlens substrate 802. However, in the example illustrated in FIG. 9, the microlens substrate is flipped, i.e. turned upside down in comparison with previously illustrated embodiments, so that the microlenses 118, i.e. the protruding curved portion of the microlenses 118 faces towards the image sensor 108.

In principle, the microlenses 118 may also be separate individual microlenses 118 attached directly to the display panel 102 or to an intermediate carrier. The microlens substrate 802 is here illustrated as being arranged on a support structure 902 in the form of a frame to form the necessary distance between the microlens substrate 802 and the transparent substrate 112 to make room for the microlenses 118. Also here, the microlenses 118 are plano-convex lenses, with the flat surface of the lens facing the carrier.

Furthermore, in applications where the microlenses 118 are arranged on a microlens substrate as illustrated in FIG. 9, or directly on the display panel 102, the opaque layer 114 can be arranged adjacent to the microlenses 118 in the manner illustrated in FIG. 8C, instead of on the transparent substrate 112 as illustrated in FIG. 9.

A further advantage of arranging the microlenses on a microlens substrate 802 or other carrier resting on a support structure 902 is that the microlenses 118 will be mechanically decoupled from the image sensor 108, thereby preventing warpage of the microlenses 118 or the image sensor 108 due to any thermal expansion mismatch. If the microlens array and the image sensor are mechanically coupled to each other, a thermal expansion mismatch may cause warpage of the microlenses which may risk reducing the imaging performance of the optical fingerprint sensor. Therefore, the microlens array and the photodetector pixel array of the image sensor may preferably be separated by a gap, such as an air gap.

The method may further comprise additional steps which are not illustrated herein, such as forming conductive structures on the opaque layer, forming additional layers such as polarization filters or wavelength filters, and/or subsequently arranging a display panel on the biometric imaging device.

Even though the invention has been described with reference to specific exemplifying embodiments thereof, many different alterations, modifications and the like will become apparent for those skilled in the art. Also, it should be noted that parts of the imaging device and method for manufacturing the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A biometric imaging device configured to be arranged under an at least partially transparent display panel and configured to capture an image of an object in contact with an outer surface of the display panel, the biometric imaging device comprising:
   an image sensor comprising a photodetector pixel array;
   a transparent substrate arranged to cover the image sensor;
   an opaque layer covering an upper surface of the transparent substrate, wherein the opaque layer further comprises a plurality of separate openings; and
   a plurality of microlenses, each microlens being located in a respective opening of the opaque layer in the same plane as the opaque layer; wherein each microlens is configured to redirect light through the transparent substrate and onto a subarray of pixels in the photodetector pixel array.

2. The biometric imaging device according to claim 1, wherein a size of the microlens correspond to a size of the opening.

3. The biometric imaging device according to claim 1, wherein the microlens is configured to focus light onto the subarray of pixels.

4. The biometric imaging device according to claim 1, wherein an active subarray defined by a subarray of pixels receiving light from only one microlens is smaller than two times the distance between the microlens and the image sensor.

5. The biometric imaging device according to claim 4, wherein the plurality of openings in the opaque layer are arranged to form an array of openings having a pitch which is larger than half the size of the active subarray of pixels in the photodetector pixel array.

6. The biometric imaging device according to claim 1, wherein the subarray has a size in the range of 20 µm to 2 mm.

7. The biometric imaging device according to claim 1, wherein the microlenses are arranged in a square, rectangular or hexagonal array having a pitch in the range of 50 µm to 2 mm.

8. The biometric imaging device according to claim 1, further comprising an at least partially transparent display panel arranged to cover the opaque layer and the microlenses.

9. The biometric imaging device according to claim 8, further comprising at least one intermediate layer arranged between the opaque layer and the display panel.

10. The biometric imaging device according to claim 9, wherein the display panel has a repeating transmission pattern defined by an array of unit cells, each unit cell in the repeatable transmission pattern comprising a first portion having a higher transparency than a second portion of the unit cell, and wherein the microlenses are arranged in locations corresponding to the first portion of the unit cell.

11. The biometric imaging device according to claim 10, wherein a size of the microlens is larger than a period of the repeating transmission pattern.

12. The biometric imaging device according to claim 8, wherein the display panel is at least partially transparent at locations corresponding to the locations of the microlenses.

13. The biometric imaging device according to claim 8, further comprising a polarizing filter located between the display panel and the image sensor.

14. The biometric imaging device according to claim 8, further comprising an optical filter located between the display panel and the image sensor.

15. The biometric imaging device according to claim 1, further comprising a plurality of electrically conductive structures arranged on the opaque layer, wherein the electrically conductive structures are connected to sensing circuitry and configured to detect an object touching a surface of the display panel.

16. The biometric imaging device according to claim 1, wherein:
  the photodetector pixel array comprises a plurality of subarrays of pixels; and
  each subarray of pixels comprises a plurality of pixels.

* * * * *